US007913290B2

(12) United States Patent
Ohta et al.

(10) Patent No.: US 7,913,290 B2
(45) Date of Patent: Mar. 22, 2011

(54) DEVICE MANAGEMENT APPARATUS, DEVICE, AND DEVICE MANAGEMENT METHOD

(75) Inventors: Ken Ohta, Yokohama (JP); Toru Egashira, Yokohama (JP); Hiroshi Inamura, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1038 days.

(21) Appl. No.: 11/267,380

(22) Filed: Nov. 7, 2005

(65) Prior Publication Data

US 2006/0112416 A1 May 25, 2006

(30) Foreign Application Priority Data

Nov. 8, 2004 (JP) ............................ P2004-324193
Oct. 5, 2005 (JP) ............................ P2005-292389

(51) Int. Cl.
*G06F 17/00* (2006.01)
*H04L 29/06* (2006.01)

(52) U.S. Cl. ............................................. 726/1; 726/4
(58) Field of Classification Search .................. 455/418; 726/1–4, 34; 709/225; 717/168–173; 713/161, 713/167, 187
See application file for complete search history.

(56) References Cited

U.S. PATENT DOCUMENTS

| 4,797,885 | A  | * | 1/1989  | Orimo et al. ................. 714/38 |
| 6,530,024 | B1 |   | 3/2003  | Proctor |
| 6,836,657 | B2 | * | 12/2004 | Ji et al. ....................... 455/419 |
| 7,213,246 | B1 | * | 5/2007  | van Rietsc ................... 718/1 |
| 2002/0078380 | A1 | * | 6/2002  | Lin et al. ..................... 713/201 |
| 2003/0163688 | A1 | * | 8/2003  | Tanaka et al. ............... 713/161 |
| 2004/0010579 | A1 |   | 1/2004  | Freese |
| 2004/0230967 | A1 | * | 11/2004 | Yuknewicz et al. ......... 717/170 |
| 2005/0059385 | A1 | * | 3/2005  | Twigg et al. ................. 455/418 |
| 2005/0085222 | A1 | * | 4/2005  | Przybilski et al. ........... 455/418 |
| 2005/0101310 | A1 | * | 5/2005  | Shachak ...................... 455/418 |
| 2005/0246767 | A1 | * | 11/2005 | Fazal et al. .................. 726/11 |

FOREIGN PATENT DOCUMENTS

| JP | 2004-86887 | 3/2004 |
| JP | 2004-118866 | 4/2004 |
| WO | WO 2005/036916 A1 | 4/2005 |

OTHER PUBLICATIONS

Jalal Al-Muhtadi, et al., "A Lightweight Reconfigurable Security Mechanism for 3G/4G Mobile Devices", IEEE Wireless Communications, vol. 9, No. 2, XP-001107343, Apr. 2002, pp. 60-65.

Vivek Haldar, et al., "Semantic Remote Attestation—A Virtual Machine directed approach to Trusted Computing", USENIX Association, May 6-7, 2004, 14 pages.

* cited by examiner

*Primary Examiner* — Michael Pyzocha
*Assistant Examiner* — Phy Anh Vu
(74) *Attorney, Agent, or Firm* — Oblon, Spivak, McClelland, Maier & Neustadt, L.L.P.

(57) ABSTRACT

A device management apparatus includes a device configuration information holding unit, a subscriber information holding unit, a security policy holding unit, a module state holding unit, and a device diagnosis unit. The security policy holding unit holds a security policy set based on the configuration based on the configuration information or the subscriber information. The device diagnosis unit examines the security policy and the module state information to make a diagnosis of a configuration of the device.

11 Claims, 11 Drawing Sheets

| MODULE TYPE | DEVICE CONFIGURATION: OS TYPE | | |
| --- | --- | --- | --- |
| | Monta Vista Linux | Symbian | ITRON |
| VIRUS CHECK | REQUIRED: ARBITRARY PRODUCT | REQUIRED: ARBITRARY PRODUCT | REQUIRED: SPECIFIED PRODUCT |
| SYSTEM FILE FALSIFICATION DETECTION | OPTION | OPTION | OPTION |
| FIREWALL | REQUIRED: ARBITRARY PRODUCT | REQUIRED: ARBITRARY PRODUCT | OPTION |
| AUTHORITY CONTROL | REQUIRED: SPECIFIED PRODUCT | REQUIRED: ARBITRARY PRODUCT | REQUIRED: SPECIFIED PRODUCT |
| INTRUSION DETECTION | REQUIRED: ARBITRARY PRODUCT | OPTION | OPTION |
| LOG MANAGEMENT | OPTION | OPTION | OPTION |

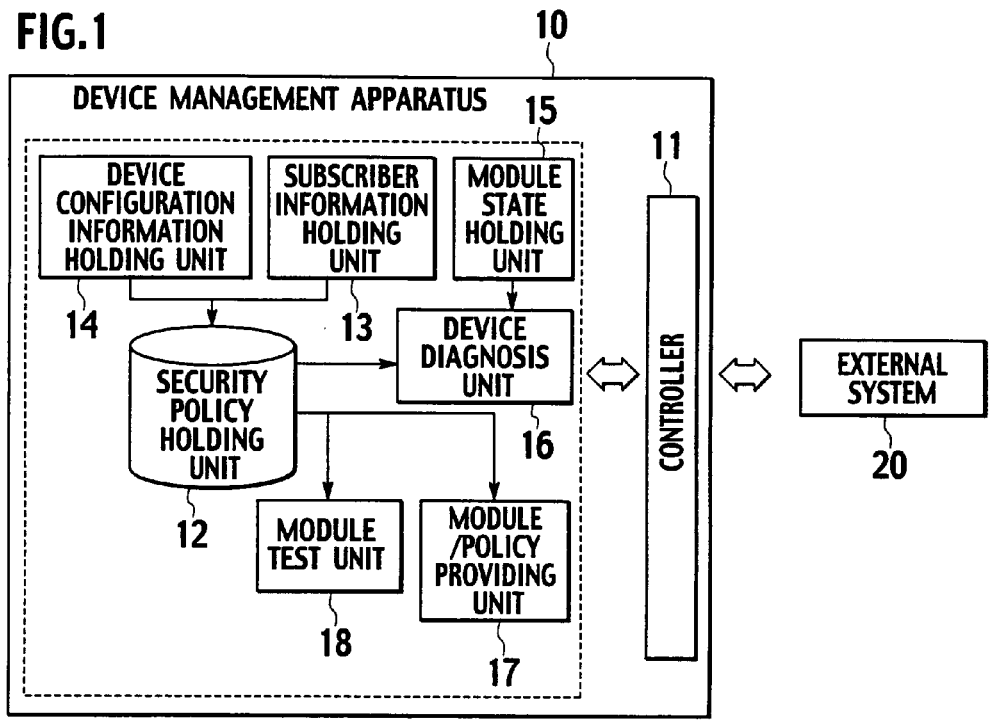

| MODULE TYPE | DEVICE CONFIGURATION : OS TYPE | | |
|---|---|---|---|
| | Monta Vista Linux | Symbian | ITRON |
| VIRUS CHECK | REQUIRED : ARBITRARY PRODUCT | REQUIRED : ARBITRARY PRODUCT | REQUIRED : SPECIFIED PRODUCT |
| SYSTEM FILE FALSIFICATION DETECTION | OPTION | OPTION | OPTION |
| FIREWALL | REQUIRED : ARBITRARY PRODUCT | REQUIRED : ARBITRARY PRODUCT | OPTION |
| AUTHORITY CONTROL | REQUIRED : SPECIFIED PRODUCT | REQUIRED : ARBITRARY PRODUCT | REQUIRED : SPECIFIED PRODUCT |
| INTRUSION DETECTION | REQUIRED : ARBITRARY PRODUCT | OPTION | OPTION |
| LOG MANAGEMENT | OPTION | OPTION | OPTION |

FIG.3

| MODULE TYPE | DEVICE CONFIGURATION : CONNECTED NETWORK (ROAMING) | | |
| --- | --- | --- | --- |
| | HOME CELLAR NETWORK | PUBLIC HOTSPOT | COMPANY INTRANET |
| VIRUS CHECK | OPTION | REQUIRED : HIGH CHECK FREQUENCY | REQUIRED : SPECIFIED PRODUCT |
| FALSIFICATION DETECTION | OPTION | OPTION : CHECK RANGE IS DIRECTORIES i, j, AND k (WIRELESS LAN SETTING, FILES, DRIVERS, ETC.) | OPTION |
| FIREWALL | OPTION | REQUIRED : BLOCK PORT a | REQUIRED : BLOCK PORT b |
| AUTHORITY CONTROL | OPTION | | OPTION |
| INTRUSION DETECTION | OPTION | REQUIRED : HIGH CHECK FREQUENCY, WIDE CHECK RANGE (SECURITY PREFERENCE) | OPTION |
| LOG MANAGEMENT | OPTION | REQUIRED : ACQUIRE DETAILED LOG | OPTION |

FIG.4

| MODULE TYPE | DEVICE CONFIGURATION : APPLICATION TYPE | | |
| --- | --- | --- | --- |
| | GAME | BANKING | COMPANY DB ACCESS |
| VIRUS CHECK | OPTION | REQUIRED : ARBITRARY PRODUCT | REQUIRED : ARBITRARY PRODUCT |
| FALSIFICATION DETECTION | OPTION | REQUIRED : ARBITRARY PRODUCT | OPTION |
| FIREWALL | OPTION : PERMIT PORT a | OPTION | OPTION |
| AUTHORITY CONTROL | REQUIRED : ARBITRARY PRODUCT (PERMIT APIx) | REQUIRED : ARBITRARY PRODUCT | OPTION |
| INTRUSION DETECTION | OPTION : LOW CHECK FREQUENCY, LIMITED CHECK RANGE (RESPONSE PREFERENCE) | REQUIRED : SPECIFIED PRODUCT | OPTION |
| LOG MANAGEMENT | OPTION | REQUIRED : ARBITRARY PRODUCT (DETAILED LOG) | REQUIRED : SPECIFIED PRODUCT |

FIG.5

| MODULE TYPE | DEVICE CONFIGURATION : EXTERNAL DEVICE TYPE | | |
|---|---|---|---|
| | EXTERNAL KEYBOARD | EXTERNAL SPEAKER | EXTERNAL MICROPHONE |
| VIRUS CHECK | OPTION | OPTION | OPTION |
| FALSIFICATION DETECTION | OPTION | REQUIRED : ARBITRARY PRODUCT (CHECK DEVICE DRIVER) | REQUIRED : ARBITRARY PRODUCT (CHECK DEVICE DRIVER) |
| FIREWALL | OPTION | OPTION | OPTION |
| AUTHORITY CONTROL | REQUIRED : ARBITRARY PRODUCT (MAIL TRANSMISSION API IS RESTRICTED) | OPTION | REQUIRED : ARBITRARY PRODUCT (PACKET COMMUNICATION API IS RESTRICTED) |
| INTRUSION DETECTION | OPTION | OPTION | OPTION |
| LOG MANAGEMENT | OPTION | OPTION | OPTION |

FIG.6

| SUBSCRIBER ID | SUBSCRIBED SERVICE TYPE | SECURITY PREFERENCE SETTING |
|---|---|---|
| SID_A | • PREMIUM SECURITY SERVICE<br>• BANKING SERVICE<br>• ONLINE SHOPPING SERVICE | • SECURITY PREFERENCE |
| SID_B | • STANDARD SECURITY SERVICE<br>• GAME SERVICE<br>• RINGING TONE SERVICE | • RESPONSE PREFERENCE |
| . . . | . . . | . . . |

FIG.7

| SUBSCRIBER DEVICE ID | | CONNECTED NETWORK ID | OPERATING SYSTEM (OS) | HARDWARE PLATFORM | SECURITY MODULE LIST | TEST RESULT | TEST TIME | SERVICE PROVISION AUTHORIZATION | CURRENTLY RUNNING SERVICE | DIAGNOSIS RESULT |
|---|---|---|---|---|---|---|---|---|---|---|
| SUBSCRIBER ID | DEVICE ID | | | | | | | | | |
| SID_A | DID_123 | NID_592 | Monta Vista Linux Ver.xx | Model_A | module_A module_B module_C | OK OK OK | 2004/8/23 13:35:40 | PERMIT | BANKING SERVICE | OK |
| SID_A | DID_456 | NID_639 | Symbian OS Ver.yy | Model_A | module_A module_D module_E | OK OK NG | 2004/8/23 10:50:44 | STOP | ONLINE SERVICE | NG |
| SID_B | DID_123 | NW_128 | Monta Vista Linux Ver.xx | Model_B | module_A module_B module_C | OK OK OK | 2004/7/12 | STOP | CONTENT DELIVERY | NG |
| SID_B | ... | | | | | | | | | |

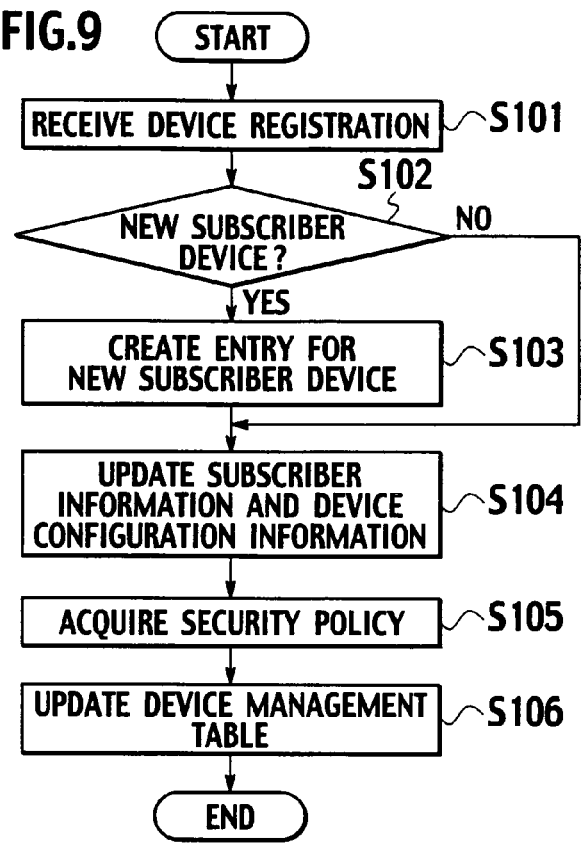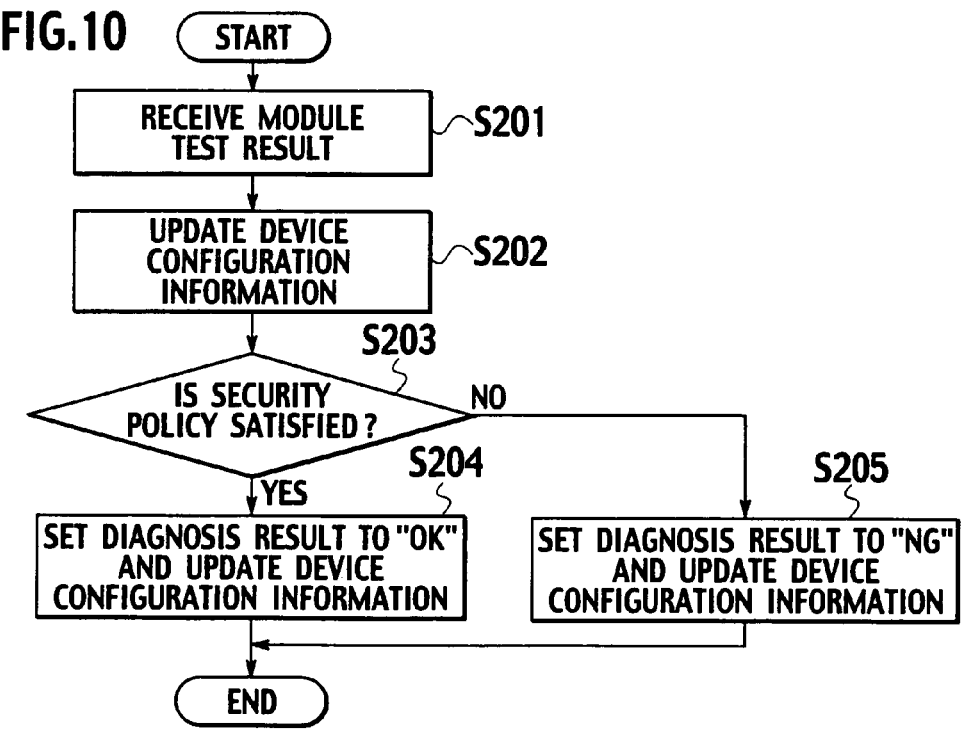

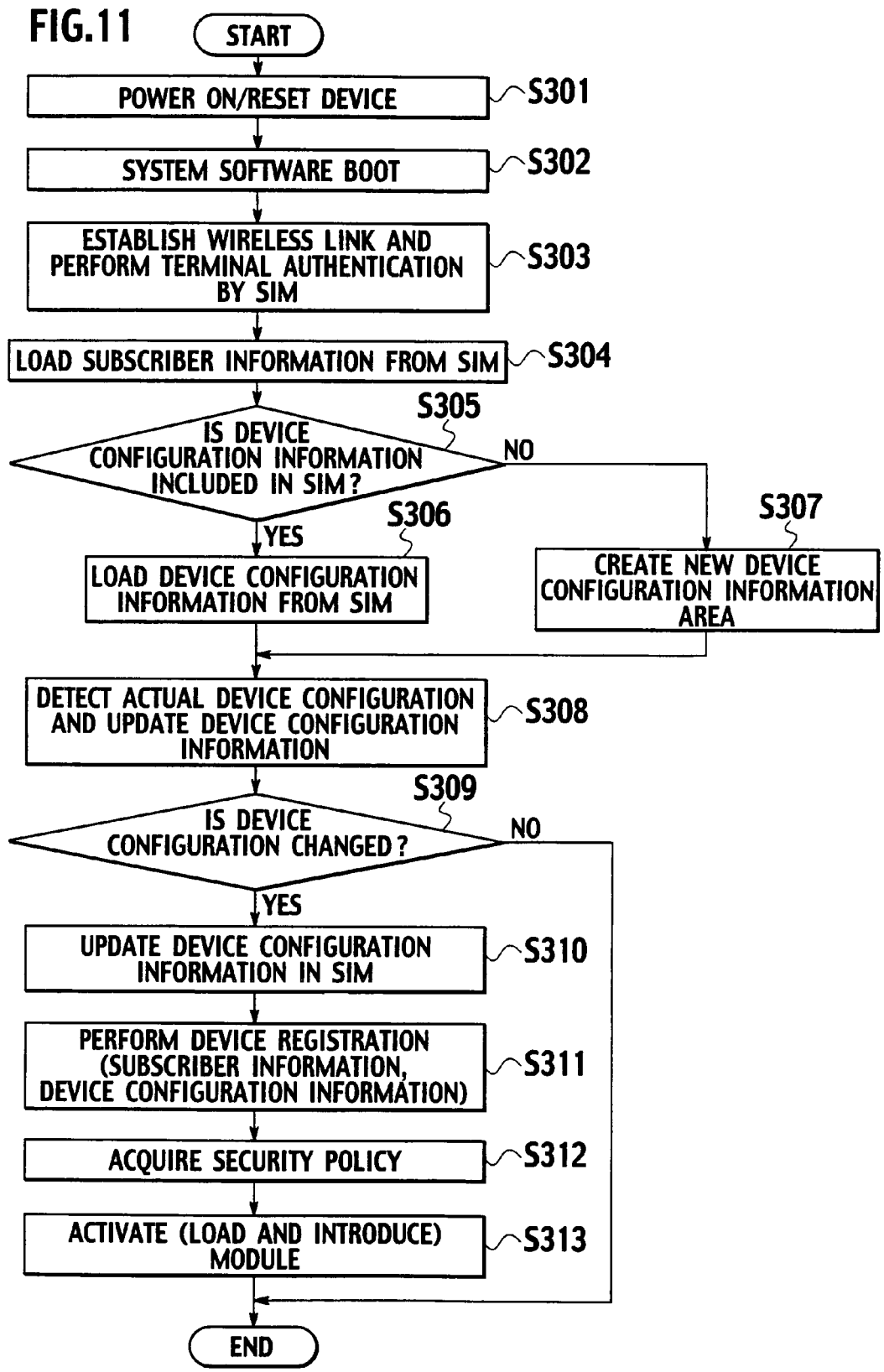

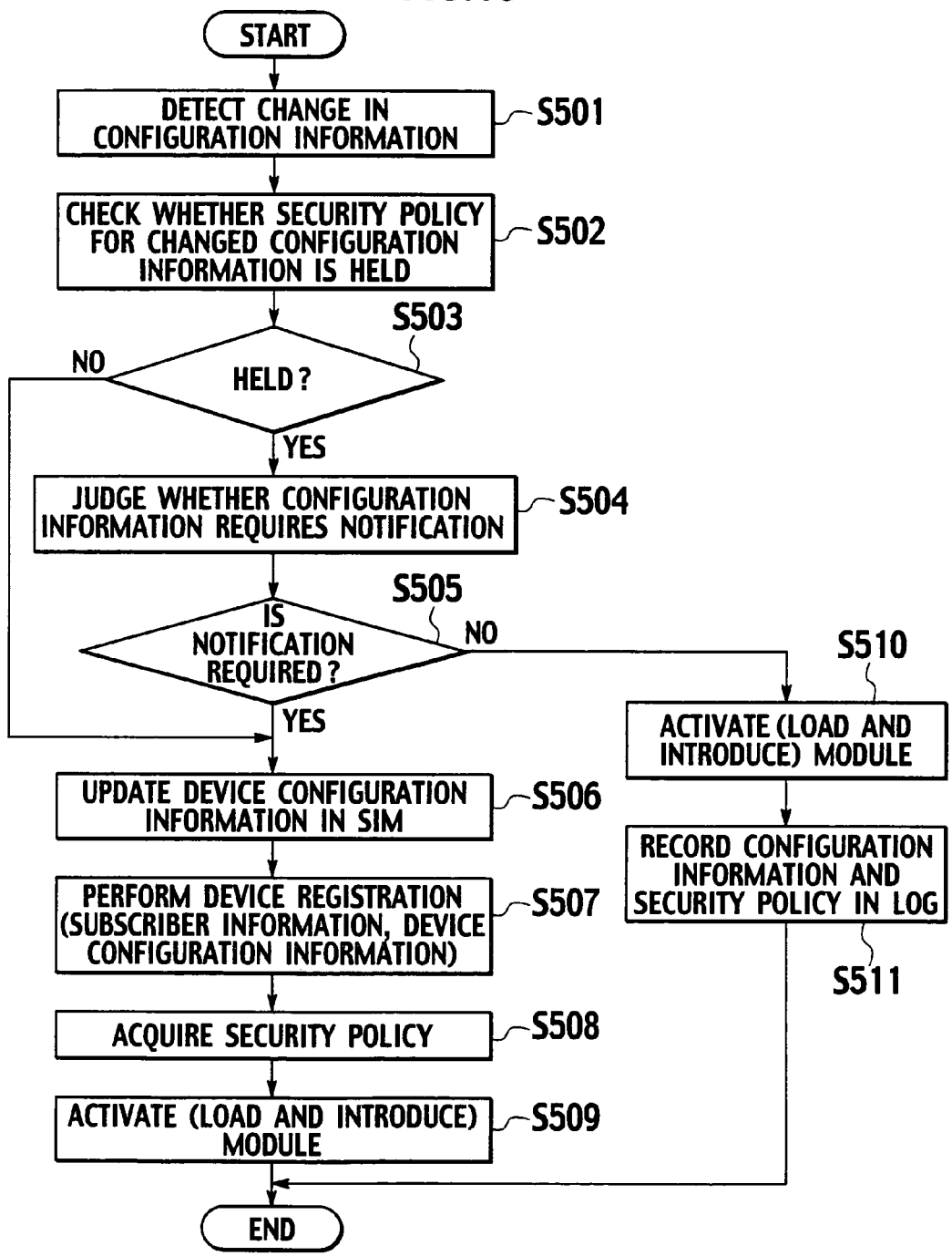

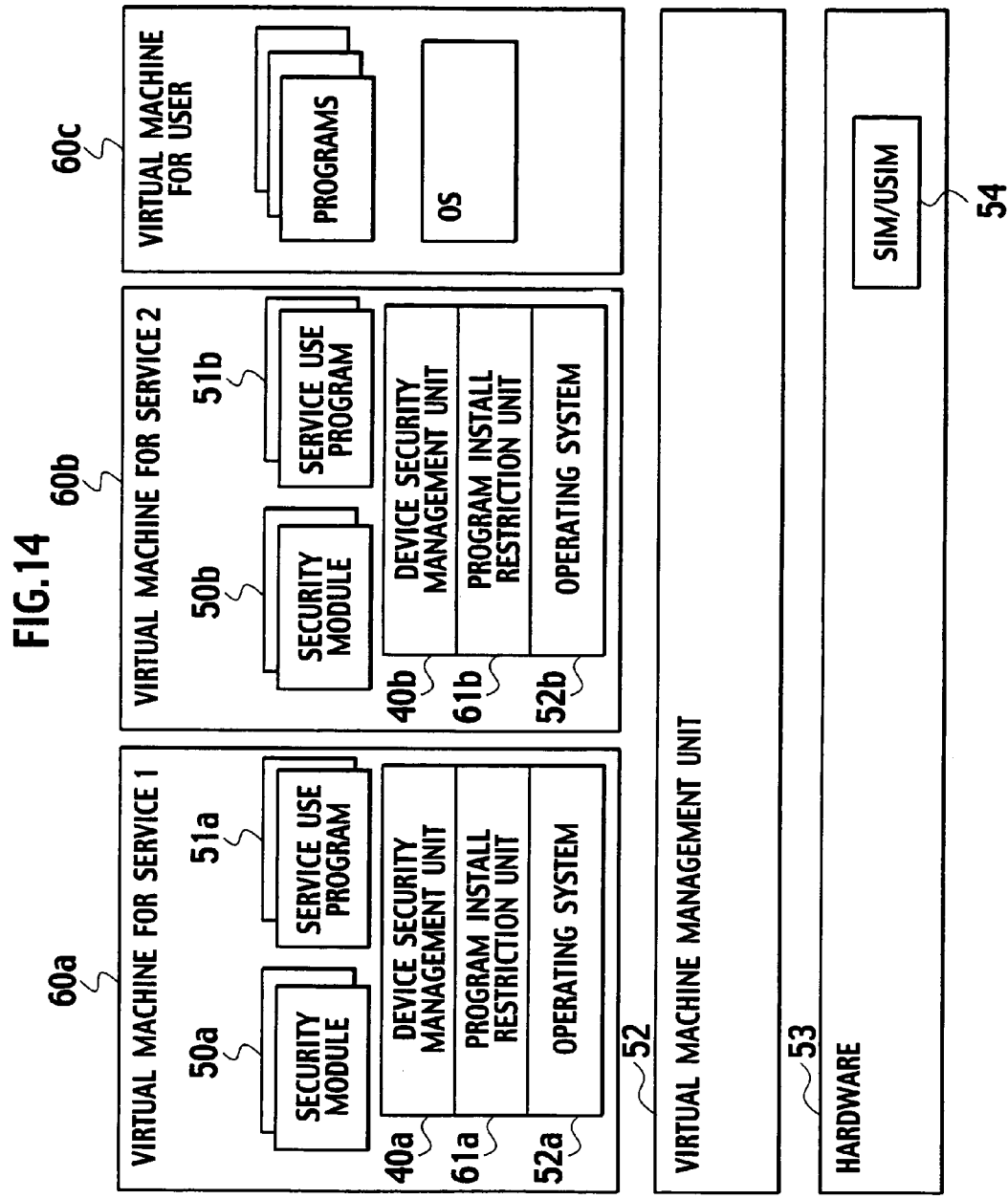

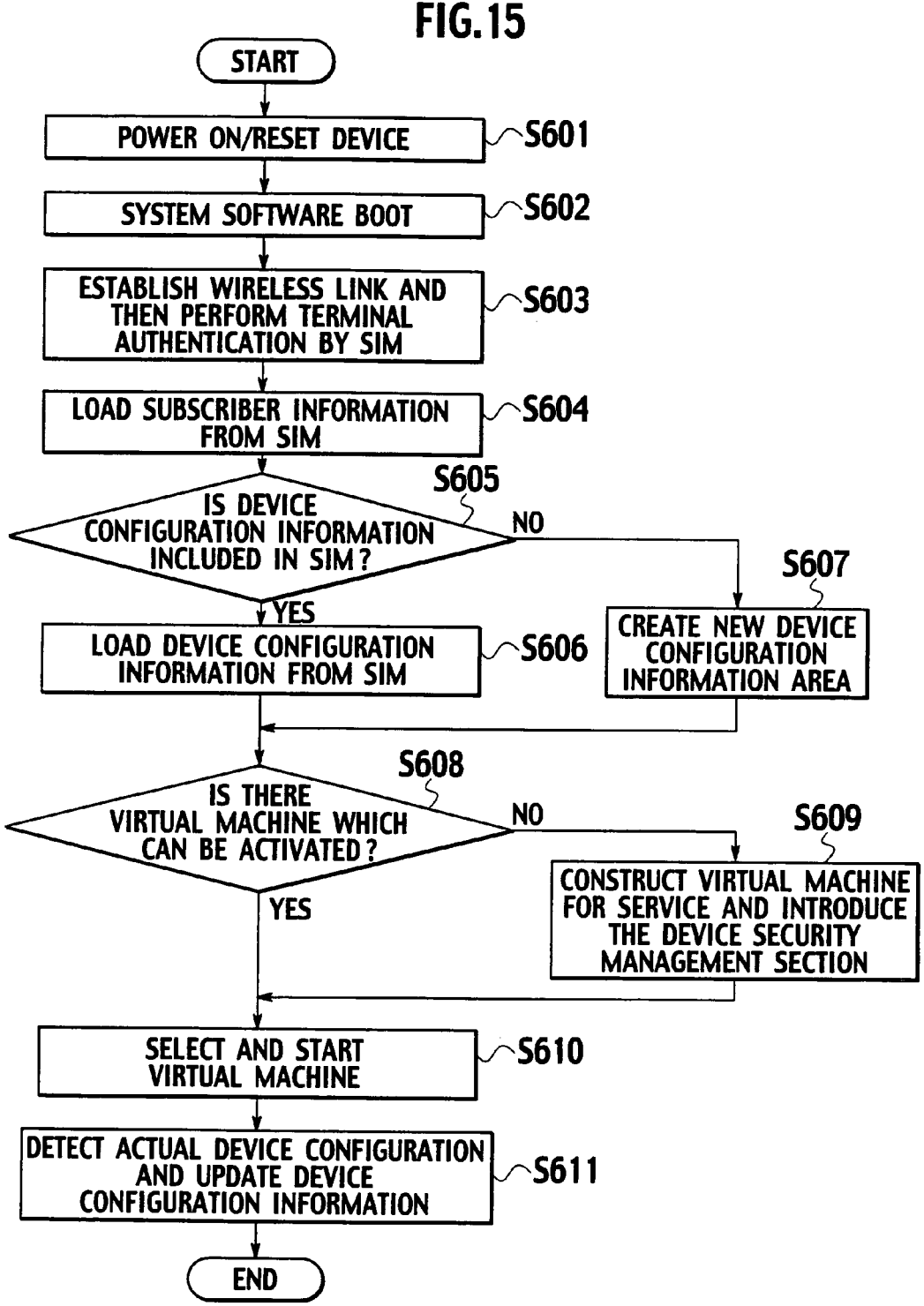

DEVICE MANAGEMENT APPARATUS, DEVICE, AND DEVICE MANAGEMENT METHOD

CROSS REFERENCE TO RELATED APPLICATIONS

This application is based upon and claims the benefit of priority from prior Japanese Patent Application P2004-324193 filed on Nov. 8, 2004 and Japanese Patent Application P2005-292389 filed on Oct. 5, 2005; the entire contents of which are incorporated by reference herein.

BACKGROUND OF THE INVENTION

1. Field of the Invention

The present invention relates to a device management apparatus, a device, and a device management method.

2. Description of the Related Art

To securely provide information communication services such as mobile phone services, banking services, content delivery, and company databases, a service provider has a requirement to confirm by authentication that subscriber's devices (mobile phones, PDAs, PCs, etc.) are not spoofing devices and also has requirements to monitor operations and states of the devices and control authorities in order to prevent improper operations. Examples of the improper operations of the devices are: information leakage such as copying sensitive data to the external network and storage, information; falsification and erasing of software and data inside devices; and attacks on other devices. The sensitive data includes user's privacy information (phone number, account information, etc.), copyrighted contents, and company's confidential information.

In order to prevent the improper operations of the devices, security modules can be installed and executed on devices to detect and block various types of attacks and anomalies. The security modules include virus check, falsification check, firewall, authority control, intrusion detection, log management, and so on.

For security and reliability of devices and services, the service provider has requirements to incorporate proper modules into each device, make proper settings, and confirm whether the state thereof is normal. For example, a device management technique is therefore disclosed which detects occurrence of an event (an execution of an operation, a change of an object, or the like) related to security on a device and updates a security policy concerning audit, information correction, anomaly detection, and countermeasures thereof (for example, see U.S. Pat. No. 6,530,024). The update of the security policy is performed by changing settings of the modules related to security, for example, such as a range of audit or information correction, threshold values for anomaly detection, and types of countermeasures (shutdown, limitation of authority, and the like). On the other hand, a device management system, which detects replacement of SIM by the bought device or the transferred device, when software is updated to add, modify, and set the modules, is disclosed (for example, see WO2005/036916). Identifiers (a manager ID and a device ID) and a profile (meta, model, firmware version, subscribed services, and the like) are registered with a management server.

Present computer networks include a variety of devices, networks, and services. Depending on the types of operating systems (OS) of devices, types of connected networks, types of executed service use programs (applications), and types of connected external devices, the security policy required for devices can be considered to be different from each other. Moreover, the external devices, applications, OSs, and networks can be newly developed and provided, and there is a possibility that a new security policy is prescribed. The devices need to follow the new security policy.

However, the device management technology disclosed in U.S. Pat. No. 6,530,024 does not include software updating means, which dynamically incorporate a module according to the update of the security policy. Accordingly, it is difficult for this technology to cope with a new computing environment of the device beyond the scope of the assumption. Specifically, even when an environmental change, such as connection of a new external device, launch of a new application, and connection to a new network, necessary modules cannot be introduced, and the security and reliability cannot be guaranteed. On the other hand, the device management system is disclosed in the publication No. WO2005/036916 does not include means of managing changes in the device configuration, including activation of different types of OSs or a plurality of OSs on a device, connection of an external device, change of a connected network, and activation of a particular application. Accordingly, the devices cannot perform introduction and setting of a proper module according to the security policy, and the device management apparatus also had difficulty in checking the introduction and settings.

In the light of the above problems, an object of the present invention is to provide a device management apparatus, a device, and a device management method, which can operate proper modules at proper settings and provide a secure information communication service.

SUMMARY OF THE INVENTION

A first aspect of the present invention is to provide a device management apparatus, including: (A) a device configuration information holding unit configured to hold configuration information of a device; (B) a subscriber information holding unit configured to hold subscriber information of a service; (C) a security policy holding unit configured to hold a security policy set based on the configuration information or the subscriber information; (D)
a module state holding unit configured to hold module state information acquired from the device; and (E) a device diagnosis unit configured to examine the security policy and the module state information to make a diagnosis of a configuration of the device.

A second aspect of the present invention is to provide a device under the control of a device management apparatus which diagnoses a configuration of the device by examining module state information acquired from the device and a security policy set based on configuration information of the device and subscriber information of a service, the device including: (A)
a configuration change detection unit configured to detect a change in the configuration information; (B)
a device registration unit configured to send the configuration information or the subscriber information to the device management apparatus; (C) a module/policy acquisition unit configured to acquire the module or the security policy from the device management apparatus; (D) a module management unit configured to install, setup, and launch of the module according to the security policy; (E) a module test unit configured to test an operation or a state of the module; and (F) a diagnosis response unit configured to send a test result of the module to the device management apparatus as state information of the module.

A third aspect of the present invention is to provide a device management method, comprising: (A) holding a security policy set based on configuration information of a device or subscriber information of a service; (B) holding module state information acquired from the device; and (C) examining the security policy and the module state information to make a diagnosis of a configuration of the device.

BRIEF DESCRIPTION OF THE DRAWINGS

FIG. 1 is a block diagram of a device management apparatus according to first and second embodiments.

FIG. 2 shows an example of a security policy including OS (Operating System) types of devices as configuration information.

FIG. 3 shows an example of the security policy including types of connected networks as the configuration information.

FIG. 4 shows an example of the security policy including application types as the configuration information.

FIG. 5 shows an example of the security policy including types of external devices as the configuration information.

FIG. 6 shows an example of subscriber information.

FIG. 7 shows an example of device configuration information.

FIG. 9 is a flowchart showing a device management method (device registration process) according to the first embodiment.

FIG. 10 is a flowchart showing a device management method (device diagnosis process) according to the first embodiment.

FIG. 11 is a flowchart showing a device management method (device boot process) according to the first embodiment.

FIG. 13 is a flowchart showing a device management method (device configuration process) according to the first embodiment.

FIG. 14 is a block diagram of a device according to a second embodiment.

FIG. 15 is a flowchart showing a device management method (device boot process) according to the second embodiment.

DETAILED DESCRIPTION OF THE INVENTION

Figure 8:
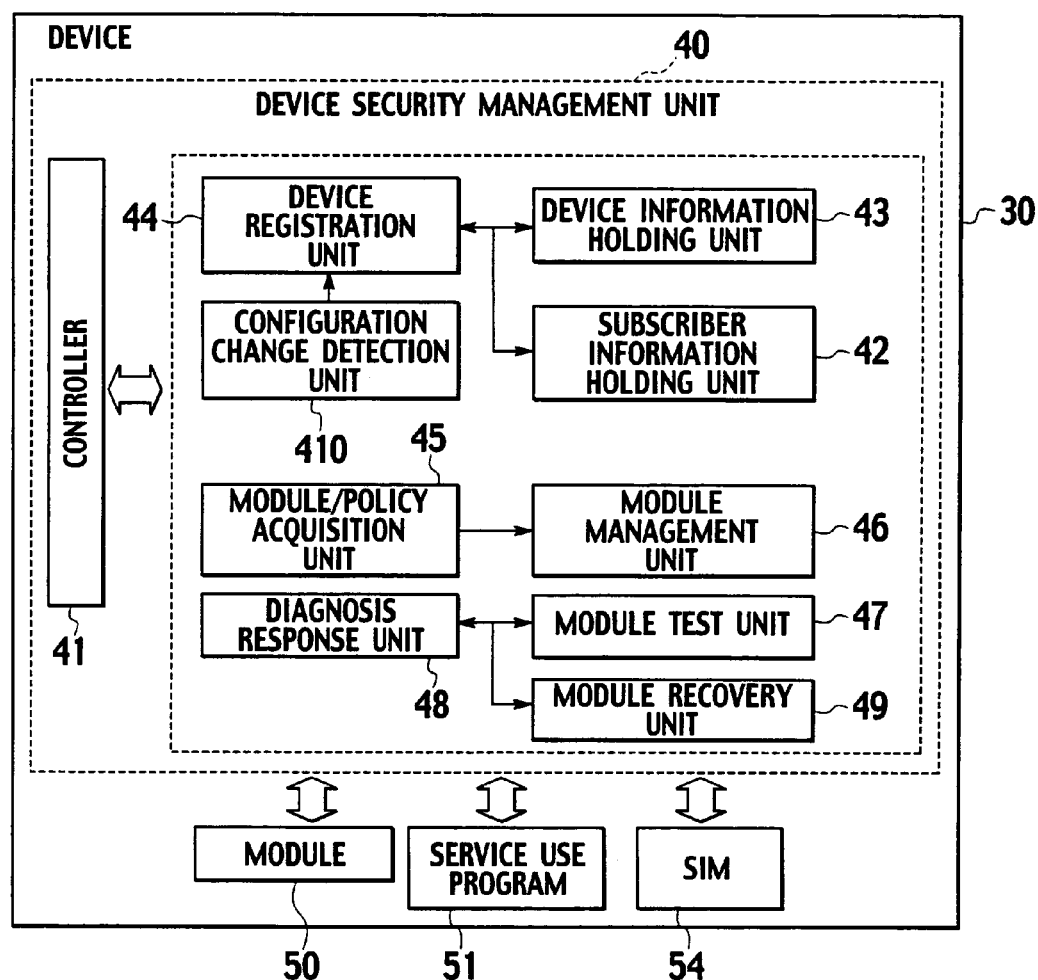
FIG. 8 is a block diagram of a device according to the first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Device Management Apparatus

A device management apparatus according to this embodiment makes diagnosis and setting of a configuration of a device and is implemented using apparatuses, for example, such as a server, a workstation, and a personal computer.

As shown in FIG. 1, a device management apparatus 10 includes a controller 11, a security policy holding unit 12, a subscriber information holding unit 13, a device configuration information holding unit 14, a module state holding unit 15, a device diagnosis unit 16, a module/policy providing unit 17, and a module test unit 18.

The controller 11 exchanges information with an external system 20 such as a device or an access control server. The controller 11 manages and controls the security policy holding unit 12, the subscriber information holding unit 13, the device configuration information holding unit 14, the module state holding unit 15, the device diagnosis unit 16, the module/policy providing unit 17, and the module test unit 18.

The security policy holding unit 12 holds a security policy set based on modules necessary for a device having a certain device configuration, configuration information of the device, and service subscriber information. As a specific example of the security policy, FIG. 2 shows examples of modules, which a certain service provider determines to be necessary for devices having different operating systems of Monta Vista Linux, Symbian, and ITRON. Herein, the examples of the modules are virus check, falsification detection, firewall, authority control, intrusion detection, and log management. This table describes whether introduction of each module is required or optional, and if required, further describes whether each module should be an arbitrary module of same type or a specific product or software.

FIG. 3 shows an example of the security policy in the case where networks to which a certain device is connected are a home cellular network, a public hotspot, and a company intranet. Herein, not only the types of modules but also check frequencies and check ranges are set in the security policy.

FIG. 4 shows examples of modules, which a service provider determines to be necessary for devices executing a banking service, a company database access service, and an on-line game service and examples of settings of the modules.

FIG. 5 shows examples of settings of the security policy for devices connected to an external keyboard, an external speaker, and an external microphone as the external devices.

The security policy holding unit 12 may read the security policy from another database to hold the security policy.

As shown in FIG. 6, the subscriber information holding unit 13 holds, as the subscriber information, subscriber identifiers and types of subscribed services, preference settings of security (settings of the subscribed services), and the like corresponding to the respective subscriber identifiers. Using the subscriber information, it is possible to provide differentiated security services. For example, a user of a subscriber identifier SID-A who subscribes to a premium security service is provided with sophisticated, comprehensive security services, while a user of SID-B who prefers quick response is provided with a light-weight security services. Moreover, it is possible to make a particular setting for a subscriber who is using the banking service that requests a special module. The subscriber information may be inputted from or synchronized with an external database for service management or subscriber management.

As shown in FIG. 7, the device configuration information holding unit 14 holds, as the device configuration information, device identifiers and operating systems, hardware, types of communication links, connected networks, test results and times of modules, running service programs (applications), and the like corresponding to the respective device identifiers. The device configuration information holding unit 14 may further hold types and identifiers of external devices, which are not shown in the drawing. Herein, an area in which the device configuration information holding unit 14 holds the information is called a device management table. A subscriber could use a plurality of devices by replacing a SIM (Subscriber Identity Module) or the like. On the other hand, a certain device could be used by a plurality of subscribers. The devices are therefore uniquely managed by the subscriber identifiers and device identifiers. FIG. 7 shows that the subscriber of SID-A is using two devices of DID_123 and DID_456, and the subscriber of SID-B used the former device of DID_123. This means, for example, that the subscriber of SID_B transferred the device of DID_123 to the subscriber of SID_A and the subscriber of SID_A removed a SIM from the device of DID_456 and inserted the SIM into the device of DID_123. The device configuration information holding unit 14 may delete entries of old devices and withdrawal subscribers to prevent the table from growing.

The module state holding unit 15 receives state information from each module in devices and maintains it in its storage. The state information includes a type of the module and a test result and time of the module.

The device diagnosis unit 16 makes a diagnosis of the device configuration using the security policy and the state information of modules and records the result of the diagnosis in the device management table. In a case with the strict security policy, the device diagnosis unit 16 may mark the diagnosis result with "OK" only if the states of all modules are OK. In another case with the moderate security policy, the device diagnosis unit 16 may mark the diagnosis result with "OK" even if some of the states of modules are "NG". The device configuration may be graded and given a numerical value as the diagnosis result.

The device diagnosis unit 16 may determine authorization of service provision to a device using the security policy and the state information of modules and record the authorization in the device management table. In a case with the strict security policy, the device diagnosis unit 16 may mark the service provision authorization with "PERMIT" only if the states of all modules are OK. In another case with the moderate security policy, the device diagnosis unit 16 may mark the service provision authorization with "PERMIT" even if some of the states of modules are "NG". An access control server, as an example of the external system 20, can restrict subscriber's accesses to services with reference to the authorization of service provision in the device management table.

The module/policy providing unit 17 sends modules and security policy, which defines modules' parameters to the device at the request of the device or device management apparatus. The module test unit 18 inquires the states from modules on the devices. The modules on the devices are inquired, for example, when the subscriber joins in a new service, when a device roams to another network, when a long period of time is elapsed from previous notification of the test result of the modules, and when testing is required by an external server.

Each of the security policy holding unit 12, subscriber information holding unit 13, device configuration holding unit 14, and module state holding unit 15 of the device management apparatus 10 may be either an internal memory such as RAM and ROM or an external memory such as a hard disk, a flexible disk, and a compact disk.

The device management apparatus 10 according to the first embodiment includes a central processing unit (CPU), and the aforementioned controller 11, device diagnosis unit 16, module/policy providing unit 17, module test unit 18, and the like are implemented as modules by hardware or disposed in an isolated environment to be executed in safety. These modules can be implanted by executing a dedicated program to use a predetermined program language in a general-purpose computer such as a personal computer.

Moreover, the device management apparatus 10 may include a program holding unit, which is not shown in the drawing, storing programs causing the CPU to execute the control process, device diagnosis process, module/policy providing process, module test process, and the like. The program holding unit is a recording medium, for example, such as RAM, ROM, a hard disk, a flexible disk, a compact disk, an IC chip, and a cassette tape. Use of these recording media can facilitate storage, transport, and sale of the programs.

(Device)

A device 30 according to this embodiment is in the control of the device management apparatus 10, which examines the security policy set based on the device configuration information or service subscriber information and the module state information acquired from a device, and then makes a diagnosis of the configuration of the device.

The device 30 is, for example, a mobile phone, a PC, or an information appliance and includes a device security management unit 40 as shown in FIG. 8. In addition, the device 30 includes a service use program 51 for using a service, a module 50, and a SIM 54 holding subscriber information. Hereinafter, a description is given of each component of the device security management unit 40.

The device security management unit 40 includes a controller 41, a subscriber information holding unit 42, a device configuration information holding unit 43, a device registration unit 44, a module/policy acquisition unit 45, a module management unit 46, a module test unit 47, a diagnosis response unit 48, a module recovery unit 49, and a configuration change detection unit 410.

The controller 41 exchanges information with external apparatuses such as the device management apparatus. Moreover, the controller 41 manages and controls the controller 41, the subscriber information holding unit 42, the device configuration information holding unit 43, the device registration unit 44, the module/policy acquisition unit 45, the module management unit 46, the module test unit 47, the diagnosis response unit 48, the module recovery unit 49, and the configuration change detection unit 410.

The subscriber information holding unit 42 holds the subscriber information including a subscriber identifier and types and settings of subscribed services corresponding to the subscriber identifier. Preferably, the subscriber information is held in an IC card such as the SIM 54 or USIM. As the subscriber information, information shown in FIG. 6 is held.

The device configuration information holding unit 43 holds device configuration information including a device specific identifier, an operating system, hardware such as a CPU, communication link types, connected networks, module state information, connected external devices, and running service programs, and the like of the device corresponding to the device identifier. As the device configuration information, information shown in FIG. 7 is held. The device specific identifier is a unique identifier given by a maker at manufacturing or a unique identifier generated when a virtual machine is created. The device specific identifier may be a host name or a number set by a service provider, a user, or a manager.

The device registration unit 44 accesses the subscriber information holding unit 42 and device configuration information holding unit 43, acquires the subscriber information and device configuration information, and sends the same to the device management apparatus.

The module/policy acquisition unit 45 acquires from the device management apparatus the security policy and modules necessary for the device 30. The module/policy acquisition unit 45 holds the acquired security policy and allows the module management unit 46 and the like to access the same.

The module management unit 46 manages modules using the security policy. Specifically, the module management unit 46 performs install, setting, and launch/load of the modules. For example, according to the security policy, the module management unit 46 launches modules necessary in a running service, a connected network, and an external device.

The module test unit 47 tests an operation and a state of each module and outputs a result of the test to the device configuration information holding unit 43. Examples of the test method include calling a self-test procedure inside the module, checking falsification of an execution image of software inside the device 30, auditing an operation of the software inside the device 30, checking a log outputted by the module, and checking a process corresponding to the module. Moreover, a test program performing an incorrect operation or an abnormal operation may be executed on the device 30 to check the reaction and soundness of the module.

The diagnosis response unit 48 sends the test result of each module held by the device configuration holding unit 43 to the device management apparatus 10 as the module state information.

The module recovery unit 49 recovers a module when the operation or state test of the module fails. For example, the module is recovered by reloading or reinstalling the module or loading or installing an alternative module.

The configuration change detection unit 410 detects changes in the configuration of the device 30 and sends the configuration information to the device management apparatus or launches or loads and sets up a module based on the security policy held. To detect the changes, an event, such as changing the connected network, attaching/detaching an external device, starting/terminating a service program, activating/terminating a virtual machine, and attaching/detaching SIM, is acquired using a function provided by the operating system or the like, or the configuration change detection unit 410 itself periodically monitors the configuration information. When the changes in the device configuration are detected, the device registration unit 44 is activated to determine whether the configuration information should be sent to the device management apparatus or not. For example, if the type of a change of the device configuration is new and the module/policy acquisition unit 45 does not hold the security policy for the device configuration or the configuration thereof is prescribed in the security policy to require notification, the configuration information is determined to be sent. On the other hand, when the policy/module acquisition unit 45 already holds the security policy for the interested configuration information or when the configuration type is the configuration type prescribed to require no notification, the module management unit 46 is called to activate and set a module based on the held security policy.

Each of the subscriber information holding unit 42 and device configuration information holding unit 43 is either an internal memory such as RAM and ROM or an external memory such as a hard disk, a flexible disk, and a compact disk.

The device 30 according to the first embodiment includes a central processing unit (CPU), and the aforementioned controller 41, device registration unit 44, module/policy acquisition unit 45, module management unit 46, module test unit 47, diagnosis response unit 48, module recovery unit 49, configuration change detection unit 410, and the like are implemented by hardware as modules or disposed in an isolated environment to be executed in safety. These modules can be implemented by executing a dedicated program for using a predetermined program language in a general-purpose computer such as a personal computer.

The device 30 may include a program holding unit, which is not shown in the drawing, storing unit causing the CPU to execute the control process, device registration process, module/acquisition process, module management process, module test process, diagnosis response process, module recovery process, configuration change detection process, and the like. The program holding unit is a recording medium, for example, such as RAM, ROM, a hard disk, a flexible disk, a compact disk, an IC chip, and a cassette tape. Use of these recording media can facilitate storage, transport, and sale of the programs.

(Device Management Method)

Next, a description is given of a device management method according to the first embodiment using FIGS. 9 to 13.

=Device Registration Process=

The process to register the device 30 in the device management apparatus 10 is described with reference to FIG. 9.

First, in step S101, the controller 11 receives the subscriber information and device configuration information from the device 30.

At this time, in step S102, in registering a device having a new pair of a subscriber identifier and a device identifier, the process proceeds to step S103, and the controller 11 creates a new entry in the device configuration information holding unit 14.

Next, in step S104, the controller 11 updates the configuration management table of the device configuration information holding unit 14 using the acquired subscriber information and device configuration information.

Next, in step S105, the controller 11 acquires the security policy prescribing a list of modules necessary for the device 30 and settings thereof from the security policy holding unit 12 using the subscriber information and device configuration information. In step S106, the controller 11 updates the device configuration management table using the acquired security policy.

=Service Provision Authorization Determination Process=

Next, the process to make a diagnosis of the device configuration in the device management apparatus 10 is described with reference to FIG. 10.

First, in step S201, the controller 11 receives the state information from modules on the device and holds the same in the module state holding unit 15.

Next, in step S202, the controller 11 updates the device configuration management table held in the device configuration information holding unit 14 using the test results of the modules included in the state information.

Next, in step S203, the device diagnosis unit 16 makes a diagnosis of the device configuration with reference to the test results of the device management table based on the security policy held in the security policy holding unit 12. For example, in the case where the security policy requires that all the test results of necessary modules are OK, if any one of the test results is NG, the process proceeds to step S205, and the result of the diagnosis is judged to be "NG". Subsequently, the "NG" is written in a diagnosis result field of the device configuration management table, and the process is terminated. On the other hand, the test results satisfy the security policy, the process proceeds to step S204, and the diagnosis result is judged to be "OK". Subsequently, the "OK" is written in the diagnosis result field of the device configuration management table, and the process is terminated.

The information of the diagnosis result of the device configuration is utilized by, for example, the access control server of the external system 20. When the device 30 accesses a service, the external access control server inquires the diagnosis result from the device management apparatus 10. When the diagnosis result is OK, the external access control server permits the access, and when the diagnosis result is NG, the external access control server denies the access. The device management apparatus 10 itself may perform such access control, or the device management apparatus 10 may notify an external server of the availability of service provision.

In the step S203, the device diagnosis unit 16 may determine the authorization of service provision with reference to the test results of the device management table based on the security policy held in the security policy holding unit 12. For example, in the case where the security policy requires that all the test results of necessary modules are OK, if any one of the test results is NG, the process proceeds to the step S205, and the service provision is determined to "stop". Subsequently, the stop is written in a service provision authorization field of the device configuration management table, and the process is terminated. On the other hand, when the diagnosis result satisfies the security policy, the process proceeds to step S204, and the service provision is determined to be permitted. Subsequently, "permit" is written in the service provision authorization field of the device configuration management table, and the process is terminated.

The information about permit and stop of the service provision is utilized by, for example, the access control server as the external system 20. When the device 30 accesses a service, the external access control server inquires the authorization of service provision from the device management apparatus 10. In the case of "permit", the external access control server permits the access, and in the case of "stop", the external access control server denies the access. The device management apparatus 10 itself may perform such access control, or the device management apparatus 10 may notify an external server of the availability of service provision.

=Device Boot Process=

Next, the process to start up the device 30 is described with reference to FIG. 11.

First, when the device 30 is powered on or reset in step S301, system software boots in step S302. In step S303, a wireless link is established through a wireless base station and an access point, and then the procedure of terminal authentication by the SIM 54 is executed.

In step S304, the controller 41 loads the subscriber identification, types and settings of subscribed services, and the like from the SIM 54.

Next, in step S305, the controller 41 judges whether the SIM 54 includes the device configuration information corresponding to the device 30. When the device configuration information is included, the process proceeds to step S306, and the device configuration information corresponding to the device identifier of the device 30 is loaded from the SIM 54 into the device configuration information holding unit 43. On the other hand, when the device configuration information corresponding to the device identifier is not included in the SIM 54, the process proceeds to the step S307. The device 30 is judged to be a new device, and an area for the device configuration information corresponding to that device identifier is created in the SIM 54.

Next, in step S308, the controller 41 detects the device identifier, operating system, communication link type, connected network, module install information, connected external device, running service programs, and the like of the actual device and updates the device configuration information of the device configuration information holding unit 43.

At that time, in step S309, the controller 41 judges whether the device configuration has changed. When the device configuration information is different from the information loaded from the SIM 54 or when the device 30 is a new device, the device configuration information in the SIM 54 is updated in step S310.

Furthermore, in step S311, the device registration unit 44 sends the subscriber information and device configuration information to the device management apparatus 10. When the detected device configuration information matches the information loaded from the SIM 54, this registration is not carried out so that the traffic is reduced.

Next, in step S312, the module/policy acquisition unit 45 acquires the security policy from the device management apparatus 10. In step S313, the module management unit 46 activates a proper module with proper settings. At that time, the module management unit 46 loads and introduces a module if necessary.

=Device Test Process=

Figure 12:
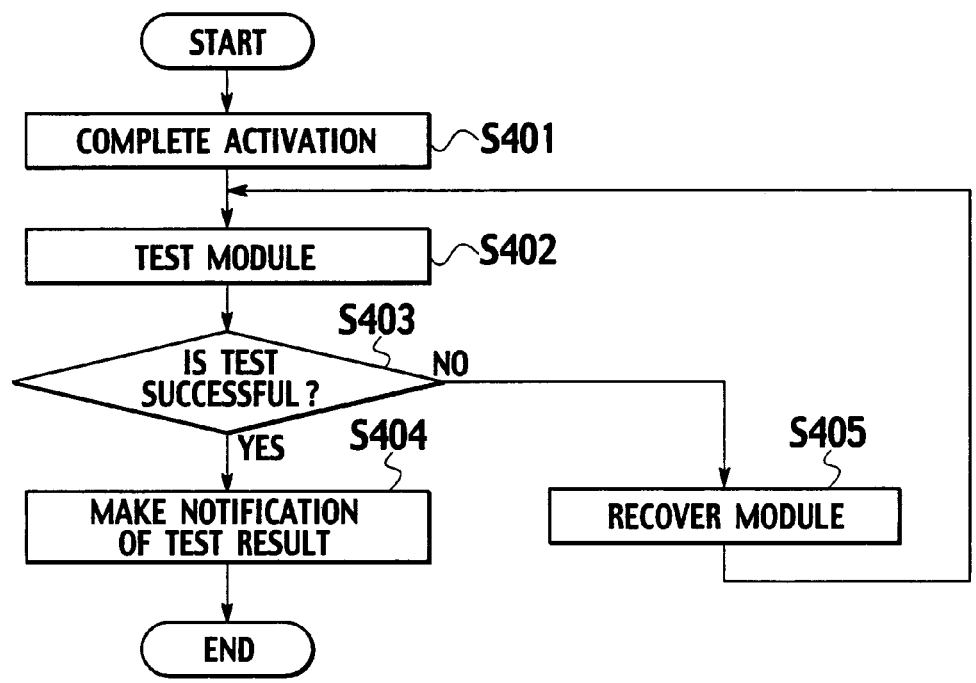
FIG. 12 is a flowchart showing a device management method (device test process) according to the first embodiment.

Next, the test process of the device 30 is described with reference to FIG. 12. The device performs the test process when the activation thereof is completed or when the device receives an inquiry from the device management apparatus.

First, in step S401, the device 30 completes the start of the system software.

Next, in step S402, the module test unit 47 executes a test for each module within the device 30.

In step S403, when this test is successful, the diagnosis response unit 48 notifies the device management apparatus 10 of the result in step S404, and the test process is completed.

On the other hand, when the test fails in step S403, the module recovery unit 49 performs the recovery process in step S405. The process then returns to S402, and the test is performed again. It is also allowed to put an upper limit on the number of retries to recovery and determine to stop the execution of the module when the number of times that the test fails reaches the upper limit.

As a modification, the notification of the module test result may be performed together with the device registration. This can reduce the traffic between the device and the device management apparatus.

=Device Configuration Modification Process=

Next, the process to modify the configuration of the device 30 is described with reference to FIG. 13.

First, when the configuration change detection unit 410 of the device 30 detects a change in the configuration information in step S501, the configuration change detection unit 410 accesses the module/policy acquisition unit 45 and check whether the security policy corresponding to the configuration information is held.

When the security policy is held in step S503, the process proceeds to step S503, and the configuration change detection unit 410 further checks whether the security policy requires notification. When the notification is required in step S505, the process proceeds to step S506. The step S506 to step S509 are the same as those of the steps S310 to S313 of the device activation process (FIG. 11). In the process of the steps S506 to S509, after the device is registered in the device management apparatus and receives the security policy, the introduction and setting of modules are performed, and the procedure is terminated.

On the other hand, when the security policy is held in the step S503 and the notification is not required in the step S505, the introduction and setting of modules are performed according to the security policy in step S510. In step S511, the configuration information and security policy are recorded in the log, and the procedure is terminated.

(Operation and Effect)

The conventional device security management system did not include the device configuration information and the means of managing the types of services on the device. Accordingly, it was difficult to implement the security policy on the device's side and check the implementation on the device management apparatuses' side. It is the first problem that checking whether the proper module was operating at the proper settings in the device management apparatus, for securely providing a service to a device executing a service use program with a certain device configuration.

With the device management apparatus 10, device 30, and device management method according to the first embodiment, it is possible to manage the device configuration information and subscriber information, operate proper modules on the device at proper settings, and check in the device management apparatus whether the proper modules are operating at proper settings. The service provider can confirm that modules necessary for the configuration of the device 30 are operated at proper settings and can safely provide a service. Even when the device configuration information or subscriber information changes, proper modules are properly set and operated to keep the device 30 secured. As described above, the secured information communication service can be provided while the security of an open device is properly managed and user's flexibility is ensured.

The device management apparatus 10 according to the first embodiment includes, as the configuration information, the device identifier and at least one of the operating system, hardware, communication link type, connected network, external device, and module state information corresponding to the device identifier. The device management apparatus 10 enables the service provider to sensitively select a module for the device configuration information and safely provide a service.

The device management apparatus 10 according to the first embodiment includes, as the subscriber information, the subscriber identifier and at least either the type or the settings of the subscribed service corresponding to the subscriber identifier. With this device management apparatus 10, it is possible to uniquely specify a subscriber's device even when the subscriber replaces the device or subscribers exchange their devices. Moreover, it is possible to make such fine-grained control of security. For example, a sophisticated security module is selected for a service or a subscriber requiring high-level security, while a light-weight security module is selected for a subscriber or a service preferring fast operation.

Moreover, the device management apparatus 10 according to the first embodiment includes the module/policy providing unit 17 sending a module or a security policy to the device. It is therefore possible to introduce proper modules or security policy to the device even when the device configuration information or subscriber information changes.

Furthermore, the device management apparatus 10 according to the first embodiment includes the module test unit 18 inquiring the state from each module on the device. The device management apparatus 10 can therefore confirm the state of each module on the device at any time, thus enabling secured service provision.

The device 30 according to the first embodiment manages the device configuration information and subscriber information, registers the same to the device management apparatus, and holds a security policy. Accordingly, the device can perform introduction, setting, activation, and testing of each module according to the security policy and furthermore can make notification of the test result. It is therefore possible to keep the device properly secured and allow the device management apparatus to manage the security.

The module test unit 47 of the device 30 according to the first embodiment performs the test upon the device being powered on or reset or upon the inquiry from the device management apparatus. Accordingly, the test can be surely performed at the purchase of or at the restart of the device, thus keeping the device secured. Moreover, the device management apparatus can test modules on the device's side at a desired time. It can flexibly set the test frequency and timing.

The device 30 according to the first embodiment includes the module recovery unit 49 performing recovery of a module when the test for the module by the module test unit 47 fails. This allows recovery without stopping the device even when the module includes any problem.

Second Embodiment

In a second embodiment, a description is given of a case where the device 30 includes a virtual machine management unit (generally called a virtual machine monitor). The device management apparatus 10 is the same as that of the first embodiment, and the description thereof is omitted.

(Device)

The device 30 according to the second embodiment includes a virtual machine management unit 52 as shown in FIG. 14. The virtual machine monitor is software to construct and manage a plurality of virtual computer environments (virtual machines 60a, 60b, and 60c) on a single computer. The virtual machine monitor allows the independent virtual machines to introduce and use different OSs and applications and enables control of accesses to resources such as memory and file systems among the virtual machines. Specifically, the virtual machine monitor can permit an access to a resource of a virtual machine 2 from a program within a certain virtual machine 1 while blocking an access to a resource of the virtual machine 1 from the virtual machine 2.

Using this function of the virtual machine monitor, computer environments for a user and for a service can be independently constructed in the device 30. Moreover, a security module 50a can be disposed in a virtual machine 60a to monitor a program 51b within different virtual machine 60b isolated from the virtual machine 60a.

The virtual machine management unit 52 manages the plurality of virtual machines. Specifically, the virtual machine management unit 52 provides functions to create, activate, terminate, and delete the virtual machines.

Program install restriction units 61a and 61b deny introduction of other than a program trusted by the respective virtual machine. For example, with reference to an authorized trusted program list in a setting file of a virtual machine, the operation to introduce an untrusted program which is not included in the program list is blocked to keep the virtual machine secured.

Each of device security management units 40a and 40b has the same configuration and performs the same operations as the device security management unit 40 shown in FIG. 8. A function specific to the second embodiment is shown below.

The device configuration information holding unit 43 holds the device configuration information of at least one of the virtual machines.

The device registration unit 44 sends the device configuration information of at least one of the virtual machines for executing a service to the device management apparatus.

The module management unit 46 selects a proper virtual machine to install a module. The module management unit 46 can select a virtual machine, for example, according to the settings attached to the module.

In FIG. 14, the virtual machine management unit 52 constructs three virtual machines of the virtual machines 60a and 60b for services and the virtual machine 60c for a user. The security modules 50a and 50b, device security management units 40a and 40b, program install restriction units 61a and 61b are located on top of the respective operating systems within the virtual machines in FIG. 14 but may be incorporated in the respective operating systems or in the virtual machine management unit 52.

(Device Management Method)

Next, a description is given of a device management method according to the second embodiment using FIG. 15.

=Device Activation Process=

First, when the device 30 is powered on or reset in step S601, the system software (virtual machine monitor) boots in step S602. In step S603, a wireless link is established through a wireless base station and an access point, and then a terminal authentication procedure by the SIM 54 is executed.

In step S604, the controller 41 loads the subscriber identifier, the type and settings of a subscribed service, and the like from the SIM 54 into the subscriber information holding unit 42.

Next, in step S605, the virtual machine management unit 52 judges whether the SIM 54 includes the device configuration information corresponding to the device 30. When the device configuration information is included, the process proceeds to step S606, and the device configuration information corresponding to the device identifier of the device 30 is loaded into the device configuration information holding unit 43. On the other hand, when the SIM 54 does not include the device configuration information corresponding to that device identifier, the process proceeds to step S607, and the device 30 is judged to be a new device. Subsequently, an area for the device configuration information corresponding to that device identifier is created in the SIM 54.

Next, when the device 30 includes a plurality of virtual machines, which can be activated in, step S608, and the virtual machine management unit 52 automatically selects a virtual machine to be activated based on the settings in the SIM 54 in step 610. Alternatively, the virtual machine to be activated may be selected by the user. The user may specify the virtual machines to be activated, and such settings may be stored in the SIM. Moreover, a single or a plurality of virtual machines may be activated. Herein, for example, the virtual machines 2 and 3 are assumed to be for a user with a subscriber identifier SID_A and for a user with a subscriber identifier SID_B, respectively. At this time, the virtual machine 2 is activated when the user of SID_A inserts a SIM into the device 30, and the virtual machine 3 is activated when the user with the subscriber identifier SID_B inserts a SIM into the device 30. In such a manner, in the case where the device 30 is utilized with the SIM replaced, even when the subscriber is changed, the computer environment including a security module corresponding to the subscriber information can be activated only by switching the virtual machines.

On the other hand, when virtual machines which are able to be activated do not exist in the device 30 in the step S608, the virtual machine management unit 52 constructs at one or more virtual machines for a service, and the device security management unit 40 is introduced into the same in step S609. At this time, a plurality of virtual machines for a user or virtual machines for services can be constructed together. The virtual machine management unit 52 may construct the virtual machines by allowing the user to specify parameters for a platform, a memory, storage, and the like of the virtual machines. Furthermore, each virtual machine may be constructed by loading a virtual machine image from servers.

Steps after the virtual machine management unit 52 activates the virtual machines, that is, steps after step S610 are the same as those of the steps after the step S307 in FIG. 11, and the description thereof is omitted.

=Device Test Process=

Next, the test process of the device 30 according to the second embodiment is described with reference to FIG. 12. This test procedure is the same as that of the first embodiment.

First, in step S401, the device 30 completes the activation of the system software (virtual machine monitor).

Next, in step S402, the module test unit 47 executes a test for security modules within the virtual machines 60a, 60b, and 60c.

When this test is successful in step S403, the diagnosis response unit 48 notifies the device management apparatus 10 of the result thereof in step S404, and the test process is completed.

On the other hand, when the test fails in step S403, the module recovery unit 49 performs the recovery process in step S405. The process then returns to S402, and the test is performed again. Moreover, it is allowed to put an upper limit on the number of retry to recover and determine the execution of the module to stop when the number of times that the test fails reaches the upper limit.

The module test unit 47 may call a module test unit in different virtual machines. For example, the module test unit 47 within the virtual machine 60a of FIG. 14 calls a module within the virtual machine 60b to test soundness of the virtual machine 60a itself. This allows detection of anomalies, which cannot be detected by the module in the virtual machine 60a. Moreover, the module test unit 47 of the virtual machine 60b may activate the module within the virtual machine 60b to test soundness of the virtual machine 60a. In this case, even if the virtual machine 60a is damaged by a virus or an attack, the module of the virtual machine 60b is protected from the virus or a malicious attacker and can detect anomalies of the virtual machine 60a or restrict authorities thereof.

(Operation and Effect)

The conventional device security management system had problems that various security modules operating on the device prevented the user from freely installing and executing programs.

In the second embodiment, virtual machines are constructed on the device 30, and an environment for service use programs and an environment for a user are independently constructed and isolated. The device configuration information is registered in the device management apparatus 10 for each virtual machine. This allows the virtual machines to introduce different security modules. Accordingly, the virtual machine for executing services can ensure the security of services, and the virtual machines for a user can ensure user's convenience. Moreover, the device management apparatus 10 can manage the device security for each virtual machine.

Moreover, the device 30 according to the second embodiment includes the program install restriction units 61a and 61b. Installing untrusted programs into virtual machines can be prevented. Accordingly, it is possible to prevent the virtual machines for services from introducing improper programs and keep the virtual machines secured.

Other Embodiments

The present invention has been described according to the foregoing first to second embodiments. However, it should be understood that the description and drawings which partially constitute the present disclosure do not limit this invention. From this disclosure, various alternative embodiments, embodiments and operational technologies will become apparent to those skilled in the art.

For example, the device configuration information held by the device management apparatus 10 may be received from the device 30 or registered by an external system or a user. In a similar way, the device configuration information held by the device 30 may be received from the device management apparatus 10 or registered by an external system or a user. The same applies to the subscriber information held by the device management apparatus 10 and the subscriber information held by the device 30.

Various modifications will become possible for those skilled in the art after receiving the teachings of the present disclosure without departing from the scope thereof.

What is claimed is:

1. A device management apparatus, comprising:
a device configuration information holding unit configured to hold configuration information of a device which identifies a configuration of the device;
a subscriber information holding unit configured to hold subscriber information of a service which identifies a subscriber of a service;
a security policy holding unit configured to hold a security policy which identifies a type of configuration of the device and/or subscriber information, and indicates a necessity of a module for the type of configuration of the device, the module being configured to perform a type of security protection of the device;
a module state holding unit configured to hold module state information acquired from the device which shows a type of module at the device and a test result of the module at the device, the test result being the result of a test regarding whether a module at the device operates normally or not, wherein the test includes calling a self-test procedure inside the module, checking falsification of an execution image of software inside the device, checking a log outputted by the module, and checking a process corresponding to the module; and
a device diagnosis unit configured to examine the availability of the device by comparing the necessity of the module at the device for the type of configuration of the device indicated by the security policy with the module state information and the test result, and based on the comparison the device diagnosis unit is configured to allow service to be provided to the device when the module state information satisfies the security policy, and to not allow service to be provided to the device when the module state information does not satisfy the security policy, wherein the module state information does not satisfy the security policy when the result of the test is that the module does not operate normally and the necessity of the module indicates that the module is required, the module state information does satisfy the security policy when the result of the test indicates that the module operates normally and the necessity of the module indicates that the module is required, and the module state information does satisfy the security policy when the result of the test indicates that the module does not operate normally and the necessity of the module indicates that the module is not required.

2. The device management apparatus according to claim 1, wherein the device configuration information holding unit includes, as the configuration information, a device identifier and at least one of an operating system, hardware, a communication link type, a connected network, an external device, a running application, and module state information corresponding to the device identifier.

3. The device management apparatus according to claim 1, wherein the subscriber information holding unit includes, as the subscriber information, a subscriber identifier and at least one of a type and a setting of a subscribed service corresponding to the subscriber identifier.

4. The device management apparatus according to claim 1, further comprising a module/policy providing unit configured to send one of a module and the security policy to the device.

5. The device management apparatus according to claim 1, further comprising a module test unit configured to inquire of the device the status of modules on the device.

6. A system comprising:
a device management apparatus, which comprises:
a device configuration information holding unit configured to hold configuration information of a device which identifies a configuration of the device,
a subscriber information holding unit configured to hold subscriber information of a service which identifies a subscriber of a service,
a security policy holding unit configured to hold a security policy which identifies a type of configuration of the device and/or subscriber information, and indicates a necessity of a module for the type of configuration of the device, the module being configured to perform a type of security protection of the device,
a module state holding unit configured to hold module state information acquired from the device which shows a type of module at the device and a test result of the module at the device, the test result being the result of a test regarding whether a module at the device operates normally or not, wherein the test includes calling a self-test procedure inside the module, checking falsification of an execution image of software inside the device, checking a log outputted by the module, and checking a process corresponding to the module, and
a device diagnosis unit configured to examine the availability of the device by comparing the necessity of the module at the device for the type of configuration of the device indicated by the security policy with the module state information and the test result, and based on the comparison the device diagnosis unit is configured to allow service to be provided to the device when the module state information satisfies the security policy, and to not allow service to be provided to the device when the module state information does not satisfy the security policy, wherein the module state information does not satisfy the security policy when the result of the test is that the module does not operate normally and the necessity of the module indicates that the module is required, the module state information does satisfy the security policy when the result of the test indicates that the module operates normally and the necessity of the module indicates that the module is required, and the module state information does satisfy the security policy when the result of the test indicates that the module does not operate normally and the necessity of the module indicates that the module is not required; and
the device, which comprises:
a configuration change detection unit configured to detect a change in the configuration information, a device registration unit configured to send the configuration information or the subscriber information to the device management apparatus, a module/policy acquisition unit configured to acquire a module or security policy from the device management apparatus, a module management unit configured to install, setup, and launch of the module according to the security policy, a module test unit configured to test an operation or a state of the module, and a diagnosis response unit configured to send the test result of the module to the device management apparatus as state information of the module.

7. The system according to claim 6, wherein the module test unit performs the test upon the device being powered on or reset or an inquiry from the device management apparatus.

8. The system according to claim 6, the device further comprising a module recovery unit configured to perform recovery of the module when the test on the module by the module test unit fails.

9. The system according to claim 6, the device further comprising:

a virtual machine management unit configured to manage a plurality of virtual machines, wherein a device configuration information holding unit holds the device configuration information of at least one of the virtual machines, the device registration unit sends the device configuration information and subscriber information of at least one of the virtual machines to the device management apparatus, and the module management unit selects a proper one of the virtual machines and performs the install and setting of the module.

10. The system according to claim 9, the device further comprising a program install restriction unit which, when a program is installed to each of the virtual machines, denies the install of another program not authorized by the virtual machine.

11. A device management method implemented on a device management apparatus, comprising:

holding, at the device management apparatus, configuration information of a device which identifies a configuration of the device or subscriber information of a service which identifies a subscriber of a service;

holding, at the device management apparatus, a security policy which identifies the type of configuration of the device and/or subscriber information, and indicates a necessity of a module for the type of configuration of the device, the module being configured to perform a type of security protection of the device;

holding, at the device management apparatus, module state information acquired from the device which shows a type of module at the device and a test result of the module at the device, the test result being the result of a test regarding whether a module at the device operates normally or not, wherein the test includes calling a self-test procedure inside the module, checking falsification of an execution image of software inside the device, checking a log outputted by the module, and checking a process corresponding to the module; and examining, at the device management apparatus, the availability of the device by comparing the necessity of the module at the device the type of configuration of the device indicated by the security policy with the module state information and the test result to make a diagnosis of a configuration of the device, and based on the comparison, allowing service to be provided to the device when the module state information satisfies the security policy, and not allowing service to be provided to the device when the module state information does not satisfy the security policy, wherein the module state information does not satisfy the security policy when the result of the test is that the module does not operate normally and the necessity of the module indicates that the module is required, the module state information does satisfy the security policy when the result of the test indicates that the module operates normally and the necessity of the module indicates that the module is required, and the module state information does satisfy the security policy when the result of the test indicates that the module does not operate normally and the necessity of the module indicates that the module is not required.

* * * * *